April 12, 1938. H. JUNGHANS 2,113,693
ELECTRIC SYNCHRONOUS MOTOR
Filed Feb. 18, 1936

Inventor:
Helmut Junghans
By Emil Bönnelycke
Attorney

Patented Apr. 12, 1938

2,113,693

UNITED STATES PATENT OFFICE 2,113,693

ELECTRIC SYNCHRONOUS MOTOR

Helmut Junghans, Schramberg-Sulgen, Eckenhof, Germany

Application February 18, 1936, Serial No. 64,577
In Germany October 18, 1935

4 Claims. (Cl. 172—275)

It is required of synchronous motors, such as are preferably used for driving the movement mechanisms of clocks, for driving talking machines and for similar purposes, that it should be possible for them to be driven with different potentials. For this purpose, two windings and, consequently, three connecting terminals are generally provided, for example for potentials of 110 and 220 volts. These precautions increase the cost of production, necessitate materials (copper) which cannot be produced in sufficient quantities in the country and require of inexperienced persons who wish, for example, to change over the synchronous clock to another potential, a certain amount of skill and consideration, that is to say, they afford a source of danger if not carefully handled.

The object of the present invention is to simplify synchronous motors for several potentials, such as are installed, in particular, in household instruments, both with regard to their manipulation by unskilled persons and with regard to their construction. According to the invention, this object is achieved owing to the fact that while use is made of a single coil winding the adaptation to the supply voltage at a given moment is effected by corresponding influencing of the magnetic flux. According to a further feature of the invention, it is consequently possible, with increasing potentials, to insert corresponding shunt members in the magnetic circuit for keeping constant the magnetic flux acting at the rotor. It is preferable to use as shunt members iron stirrups which can be secured to the stator with their ends next to both ends of the coil. According to a further feature of the invention, the shunt members are constructed as stirrups adapted to be fittted or clamped on to and freely removed from the stator or intermediate members which may, if required, be provided thereon. Finally the shunt members may be permanently connected with the stator, for example by articulation to one side, so that they merely need to be pivoted for connection or disconnection.

Figure 1:
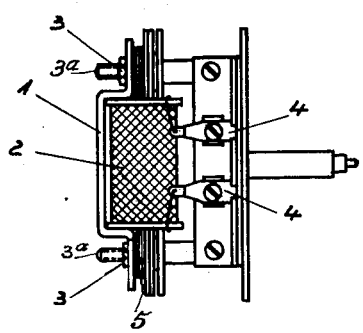
Figure 2:
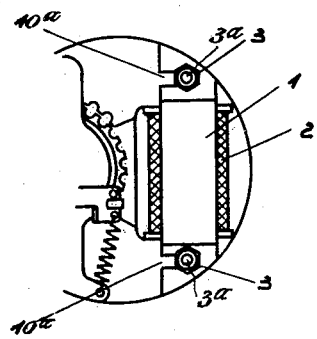
Figure 3:
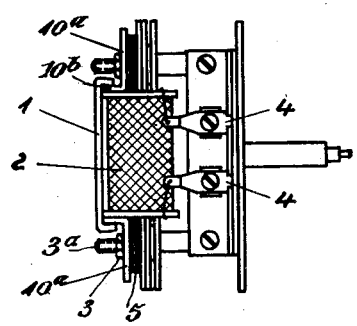
Figure 4:
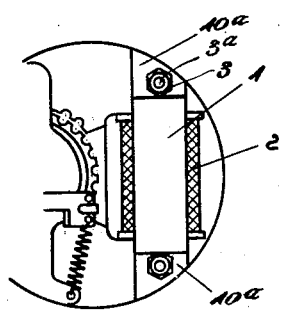
Figure 5:
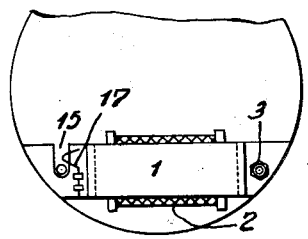
Figure 6:
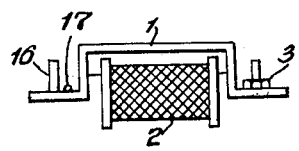

Two constructional examples of the invention are illustrated in the accompanying drawing, in which:

Figures 1 and 2 are side and front elevations respectively of a synchronous motor for an electric clock, with a shunt stirrup adapted to be screwed on, Figures 3 and 4 show, also in side and front elevation, a synchronous motor with a shunt stirrup adapted to be clamped on, Figs. 5 and 6 are plan and front views respectively of a modified construction.

The synchronous motor illustrated in Figures 1 and 2, which is intended to drive the movement mechanism of a so called synchronous clock, has a single winding 2 with two terminals 4 for the current leads. On both sides of the ends of the coil 2, the horseshoe-shaped stator 5 is traversed by screw bolts 3a. By means of the said screw bolts and nuts 3, the shunt stirrup 1 bridging the coil in the form of a wide iron rail 1 may be secured. Slots 10a are provided in the stirrup 1 in order that it may be secured in a simple manner, so that after simple loosening of the nuts 3 the stirrup may be withdrawn or pushed in from the side.

The manipulation of the stirrup is further simplified if it can be clamped on the stator, for example, by its natural resiliency. Such an arrangement is shown in Figures 3 and 4. The screw bolts 3a and the nuts 3 serve, in this case, for the permanent securing of intermediate members or stirrup holders 10a with inclined engagement surfaces 10b, with which engage the ends, also inclined, of the resilient shunt stirrup 10. The manipulation of the shunt members takes place without any loosening or operation of securing means, such as screws or nuts, merely by pressing on and lifting.

The illustrated methods of securing the shunt stirrups are merely examples of a large number of simple and convenient means of fastening, which are self-evident from the foregoing references.

Figs. 5 and 6 illustrate the modification in which the stirrup 1 with its one end is secured to one end of the stator by means of the screw and bolt 3 while the other end is provided with a slot 15 in the stirrup 1, which when the stirrup is turned into the working position as shown it slides over a pin 16 at the other end of the stator and a spring 17 holds the stirrup resiliently in this position.

What I claim as new and desire to secure by Letters Patent is:

1. In a synchronous electro-motor adapted to be driven by different voltages, a single-coil winding, a rotor, a stator, and a shunt stirrup for each of the higher voltages for keeping constant the magnetic flux acting at the said rotor under an increased voltage.

2. A synchronous motor for use with different supply voltages, comprising a single coil winding with the same terminals for connection to the supply for high and low voltages, a rotor, a stator, a removable magnetic shunt, and means for securing said shunt to the stator with its ends adjacent the ends of the coil, said shunt being capable of maintaining substantially the same magnetic flux in the rotor at a high supply voltage as prevails therein at a low supply voltage with the shunt removed.

3. A synchronous motor for use with different supply voltages, comprising a single coil winding with the same terminals for connection to the supply for high and low voltages, a rotor, a stator, and a removable magnetic shunt capable of maintaining substantially the same magnetic flux in the rotor at a high supply voltage which prevails therein at a low supply voltage with the shunt removed, said shunt being in the form of a spring stirrup of iron engaging the stator.

4. A synchronous motor for use with different supply voltages, comprising a single coil winding with the same terminals for connection to the supply for high and low voltages, a rotor, a stator, and a magnetic shunt capable of maintaining substantially the same magnetic flux in the rotor at a high supply voltage as prevails therein at a low supply voltage with the shunt rendered inoperative, said shunt being in the form of a stirrup of iron pivoted at one end to the stator and with its other end movable resiliently into engagement with the stator to render the shunt operative.

HELMUT JUNGHANS.